US008473996B2

(12) United States Patent
Gordon et al.

(10) Patent No.: US 8,473,996 B2
(45) Date of Patent: Jun. 25, 2013

(54) APPARATUS AND METHODS FOR SYNDICATION OF ON-DEMAND VIDEO

(75) Inventors: Donald Gordon, Mountain View, CA (US); Hsuehmin Li, Milpitas, CA (US); Ellen Rose Fratzke, Campbell, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 427 days.

(21) Appl. No.: 12/726,318

(22) Filed: Mar. 17, 2010

(65) Prior Publication Data

US 2010/0242073 A1 Sep. 23, 2010

Related U.S. Application Data

(60) Provisional application No. 61/160,880, filed on Mar. 17, 2009.

(51) Int. Cl.
| | |
|---|---|
| *H04N 7/173* | (2011.01) |
| *G06F 3/00* | (2006.01) |
| *G06F 17/00* | (2006.01) |
| *G06F 17/20* | (2006.01) |
| *G06F 9/44* | (2006.01) |
| *H04N 5/445* | (2011.01) |

(52) U.S. Cl.
USPC ............ 725/112; 725/51; 725/61; 725/98; 715/239; 715/249; 717/172; 717/173

(58) Field of Classification Search
USPC . 725/98, 61, 51, 112; 715/239, 249; 717/172, 717/173
See application file for complete search history.

(56) References Cited

U.S. PATENT DOCUMENTS

| | | | |
|---|---|---|---|
| 2002/0152318 A1 | 10/2002 | Menon et al. | 709/231 |
| 2005/0160088 A1 | 7/2005 | Scallan et al. | 707/3 |
| 2006/0112338 A1* | 5/2006 | Joung et al. | 715/733 |
| 2006/0173985 A1 | 8/2006 | Moore | 709/223 |
| 2006/0174289 A1 | 8/2006 | Theberge | 725/87 |
| 2006/0218601 A1 | 9/2006 | Michel | 725/87 |
| 2007/0130446 A1* | 6/2007 | Minakami | 712/34 |
| 2008/0170622 A1 | 7/2008 | Gordon et al. | 375/240.18 |
| 2008/0178249 A1 | 7/2008 | Gordon et al. | 725/139 |
| 2008/0212942 A1 | 9/2008 | Gordon et al. | 386/124 |
| 2012/0004982 A1* | 1/2012 | Cohee et al. | 705/14.42 |

OTHER PUBLICATIONS

International Searching Authority, International Search Report—International application No. PCT/US2010/027724, dated Oct. 28, 2010, together with the Written Opinion of the International Searching Authority, 7 pages.

Askenas, M., U.S. Appl. No. 10/253,109 (unpublished), filed Sep. 24, 2002.

(Continued)

*Primary Examiner* — Hoang-Vu A Nguyen-Ba
(74) *Attorney, Agent, or Firm* — Sunstein Kann Murphy & Timbers LLP

(57) ABSTRACT

Metadata are provided to video generators using a syndication protocol, so that the video generators may produce interactive video content for television subscribers. Metadata relating to source media content are transformed in a computer process from a storage format into a syndication format. Relevant metadata to transform are chosen to reflect the type of interactivity desired by a television service provider and the demands of the video generation process. The transformed metadata are published according to a syndication protocol, so that another computer process that participates in the protocol may generate the interactive video content using the metadata, the source media content, and subscriber commands.

37 Claims, 3 Drawing Sheets

OTHER PUBLICATIONS

Cable Television Laboratories, Inc., "CableLabs Asset Distribution Interface Specification, Version 1.1", May 5, 2006.

RSS Advisory Board, "RSS 2.0 Specification", published Oct. 15, 2007.

European Patent Office, Extended European Search Report for International Application No. PCT/US2010/027724, dated Jul. 24, 2012, 11 pages.

* cited by examiner

APPARATUS AND METHODS FOR SYNDICATION OF ON-DEMAND VIDEO

CROSS-REFERENCE TO RELATED APPLICATION

This application claims the benefit of U.S. Provisional Application No. 61/160,880, filed Mar. 17, 2009, the content of which is hereby incorporated by reference in its entirety.

TECHNICAL FIELD

The present invention relates to syndication of on-demand video, and more particularly to syndication of media assets, generated from live events, having metadata that can be converted into a common syndication file format for distribution to subscribers.

BACKGROUND ART

Television networks acquire programming content in a number of ways. A network may generate programming content for later broadcast, for example by taping sporting events and interviews to be used in a news program. A network may also acquire programming content such as movies through arrangements with copyright holders. When programming video has been acquired, it is stored in a repository for later distribution to television subscribers, either directly or through local network affiliates.

Video programming content is typically stored with metadata that describes its characteristics. Metadata associated with a video file's physical storage may include, for example, the name of the file, the file size, codecs required to render the file in a display application, and so on. Video may be also stored with metadata describing its content, such as who was recorded, the kind of event that was recorded, the location of the event, its time and date, and a programming category (e.g. sports, news, documentary, sitcom). Metadata for various programming categories may include information relevant to that category. For example, movie metadata may also include a movie rating, a run time, a release date, a list of actors, the name of a production studio, a suggested rental or purchase price, and so on.

Metadata is stored according to a convenient file format specification. One such specification, based on Extensible Markup Language (XML), is the Asset Distribution Interface (ADI), authored by Cable Television Laboratories, Inc. of Louisville, Colo. (hereinafter CableLabs®). Version 1.1 of the ADI, referenced below, is herein incorporated by reference in its entirety.

RSS is a Web content syndication format, also based on XML. An RSS document defines a single "channel", or feed, having RSS "items" that correspond to individual pieces of content within the feed. Each item has a title or description, and a number of optional parameters including, for example, a link to underlying source material, a global identifier, one or more categories, and a publication date.

SUMMARY OF THE INVENTION

The creation of interactive video content for a television system is generally processor and memory intensive. For example, an interactive subscriber menu system may have a number of dynamic elements, such as buttons, preview video content, and so on, that must be assembled and rendered into a video stream in response to a subscriber action like pressing a navigation key on a remote control. Also, when providing customized, interactive video content to a number of network subscribers, the amount of computing resources required for generating this video is generally proportional to the number of subscribers. It is therefore advantageous to distribute the work of generating video streams among a number of different processes within a number of different processors, and among several computer memories. However, distributing media assets, such as on-demand movies, to all of the different video generators in an entire television system before it is known where (or even if) they are needed uses bandwidth and computing resources that would be better served for other tasks. Thus, it is more efficient to "pull" this data to a video generator on demand than to "push" the data to all video processors irrespective of demand. Various embodiments of the present invention solve the problem of how to inform the video generators which content is available on a real-time basis, without actually transmitting the content until it is needed.

A first embodiment of the invention is a method for providing interactive video content based on a media asset. The media asset has source media content, such as video or audio, and associated source media metadata. The media metadata is encoded in a storage format that conforms to a media metadata specification such as ADI. The method includes receiving the media asset from a data communication network. Next, in a first computer process, the method includes transforming at least a portion of the metadata from the storage format into a syndication format that conforms to a syndication metadata specification, such as RSS. Next, the method includes publishing the transformed metadata according to a syndication protocol, and in a second computer process, generating interactive video content from at least the transformed metadata. The video content may also be generated from the source media. Further, the second computer process may be an MPEG object.

Receiving the metadata may include receiving a data package comprising the metadata, which also may include receiving a collection of data packages of which the data package is one. For example, a data package may be a media asset package that contains video on demand, a movie poster, information about the director, year of release, and running time, and so on. The data communication network may be the Internet, a satellite network, a local area network, a wide area network, a storage area network, or network attached storage. The metadata may have information identifying a location from which the media asset may be retrieved. The media metadata specification may be an Asset Distribution Interface specification, and the syndication metadata specification may be an RSS specification. The syndication protocol may be the corresponding RSS protocol.

Generating video content may include encoding the content according to an MPEG specification. This may involve stitching together a plurality of MPEG video streams according to a graphics layout template. The method may further include distributing the encoded video content to a given user for display on a user display device. The distribution network may be a wide area network, a satellite network, a broadcast network, a cable network, or the Internet. In a related embodiment, the method also includes receiving an electronic command relating to the distributed video content from a user interface associated with the user display device, and, in a computer process, generating second interactive video content from the transformed metadata and the electronic command. Thus, for example, a television subscriber may use a remote control user interface to "press a button" in an interactive video menu, thereby causing a second menu or submenu to be generated and displayed. The second video content may also be generated from the source media.

The above methods may be performed on a computer system, and other embodiments of the invention include computer program products for performing these methods. The system itself may have an interface port for receiving the media asset from a data communication network, a first processor module, operatively coupled with the interface port, and a second processor module. The first processor module may enable both transforming at least a portion of the metadata from the storage format into a syndication format that conforms to a syndication metadata specification, and publishing the transformed metadata according to a syndication protocol. The second processor module may be used for generating interactive video content from the transformed metadata and the source media content. The interface port may be an Ethernet port. The first and second processor modules may be microprocessors. The system may also include a local area network or a wide area network for operatively coupling the first processor module to the second processor module.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
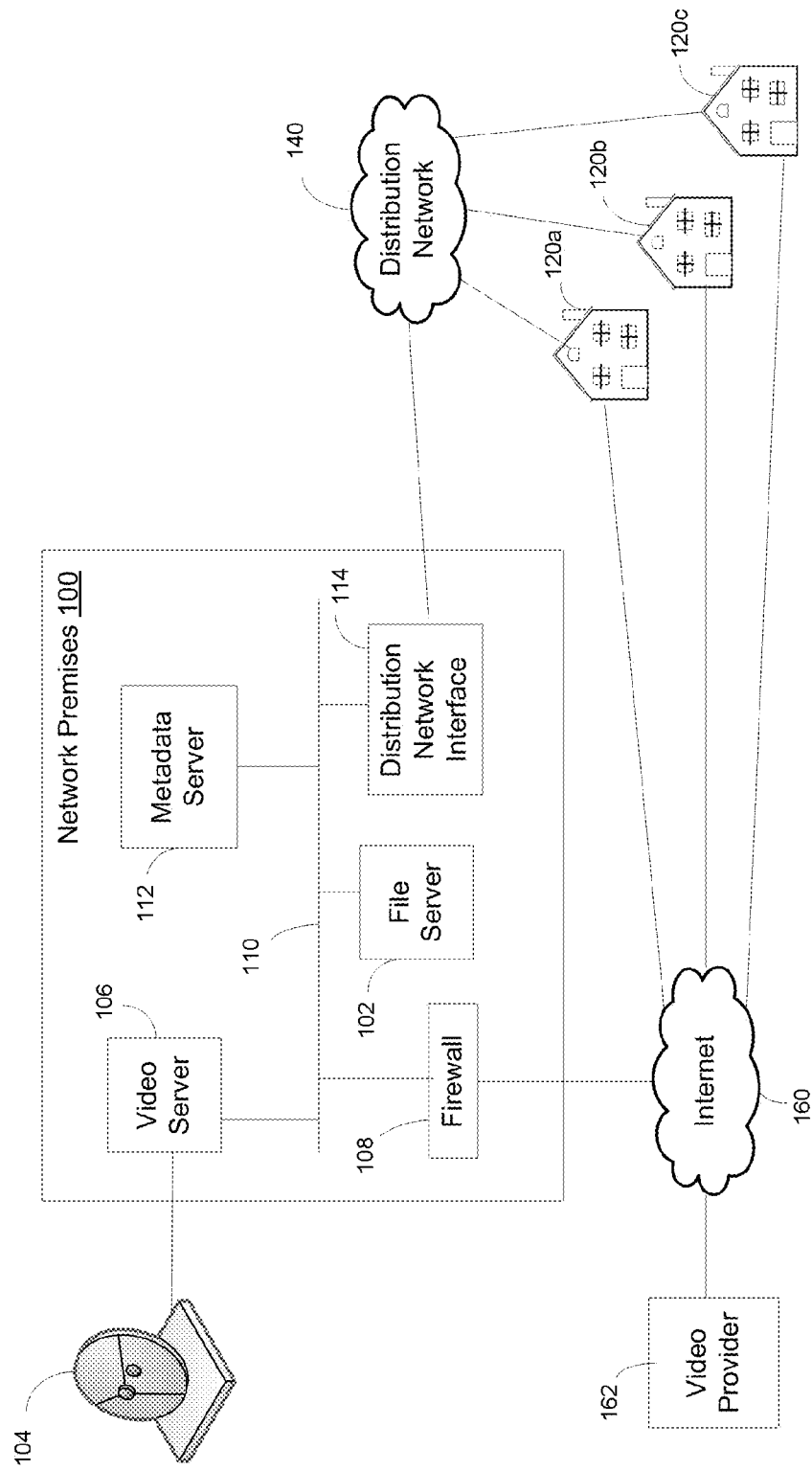
FIG. 1 is a diagram showing a system for distributing television signals in accordance with an embodiment of the invention.

Definitions. As used in this description and the accompanying claims, the following terms shall have the meanings indicated, unless the context otherwise requires:

A video generator is an apparatus or system that generates video data that is suited for display by a video display device, such as a television or set-top box. A video generator may include a video renderer, an audio renderer, an encoder, or other components that assist in the generation of video or audiovisual streams for display.

Interactive video content means video that invites a viewer to respond in an interactive fashion. The video may be displayed on a home television by means of a set top box. The viewer can interact with the video content by, for example, pressing buttons on a remote control. Or the video may be displayed on a computer screen, and the interaction may take the form of keyboard key presses and computer mouse input. However, these embodiments are only exemplary, and other forms of interactive video content may be appreciated by a person having ordinary skill in the art.

Metadata is data that pertains to other data, but does not comprise any of the substance of the other data. For example, a computer file may contain arbitrary data. Metadata pertaining to the file includes the file's creator, the time and date of its creation, the amount of data stored in the file, and a location that the file may be found. All of these attributes pertain to the file, but none form the content of the file's data. Metadata is stored in computer files according to a metadata specification, which is a specific format that allows for efficient machine processing of the metadata. Different metadata specifications exist, each tailored to describe data in a specific application domain.

A media asset is a computer file that includes audiovisual data, or "media content," and certain of its relevant metadata. A media asset may refer to other media assets. For example, a video media asset may refer to a raw video media asset and a raw audio media asset. A media asset package is a bundle of media assets delivered, tracked, and managed as a unit for distribution. For example, a media asset package for a movie could include media assets for video data, movie trailers, images for retail box covers and an insert booklet, images for posters, and other media assets.

Syndication refers to publishing media assets to individuals by subscription. Sources originating media assets provide a syndication feed, which is essentially a series of announcements of new content availability, to which an individual may subscribe. A subscriber using the syndication model of content distribution receives media assets directly from their originating source, rather than from a third party that aggregates media assets from a number of sources. The process for providing media assets in a syndication feed, and for retrieving them from the feed, is the syndication protocol. Internet syndication refers to the process of syndicating media assets to Internet users according to commonly available protocols, such as RSS.

The term "MPEG object" as used herein has the meaning described in U.S. patent application Ser. No. 12/008,697 entitled "Interactive Encoded Content System Including Object Models for Viewing on a Remote Device," and U.S. patent application Ser. No. 12/008,722 entitled "MPEG Objects, and Systems and Methods for Using MPEG Objects," the disclosures of which are hereby incorporated by reference in their entirety.

The apparatus and methods disclosed herein supplement the ordinary provision of television service to subscribers. Functional components used to facilitate operation of the television network, but not otherwise relevant to embodiments of this invention, are omitted for clarity. The relevant functional components may be implemented using standard computer equipment or custom hardware, as the television service provider deems appropriate, and may be provided by the television service provider, or by a contractor or vendor hired for this purpose.

FIG. 1 is a diagram showing a system for distributing television signals in accordance with an embodiment of the invention. A television network has network premises 100, from which television signals are transmitted to television subscribers 120 through a distribution network 140 via a distribution network interface 114. It should be noted at the outset that the invention disclosed herein may be embodied using any distribution network known in the art. By way of example and not limitation, distribution network 140 can be a wide area computer network, a network of satellites and ground stations, a radio frequency broadcast network with broadcast towers, a cable television network having cable trunks and branch nodes, or the Internet. Distribution network interface 114 then includes the equipment necessary to transmit television signals on the appropriate distribution network 140. All that is required in accordance with various embodiments of the invention is that television subscribers 120 have a television interface unit, such as a set-top box or desktop computer, that can receive and decode the television signals for display. The subscribers 120 may communicate with the network operator by sending messages back through distribution network 140, or through the Internet 160 or other return path. In this way, a television service provider can provide its subscribers with interactive, personalized content.

In the exemplary system of FIG. 1, video programming and related files, also known as source media content, are stored by a network operator in a file server 102, which is a data storage arrangement known in the art. The file server may store a great deal of source media files. These files may be used, for example, to provide television services such as video on demand. Other components may be used to acquire the source media content. For example, video and audio data from a satellite may be acquired using a satellite dish 104. Typically, this data is processed by a video server 106, using techniques known in the art, into a form that lends itself to storage on file server 102. Similarly, source media content can be received from a video provider 162, by accessing the Internet 160 through a network firewall 108. Or, a movie distributor may physically deliver a storage medium containing a digital copy of a feature film to the network operator, and the operator transfers the digital copy to file server 102. The skilled artisan may know of other methods to acquire source media content that are in accordance with an embodiment of the invention.

Figure 3:
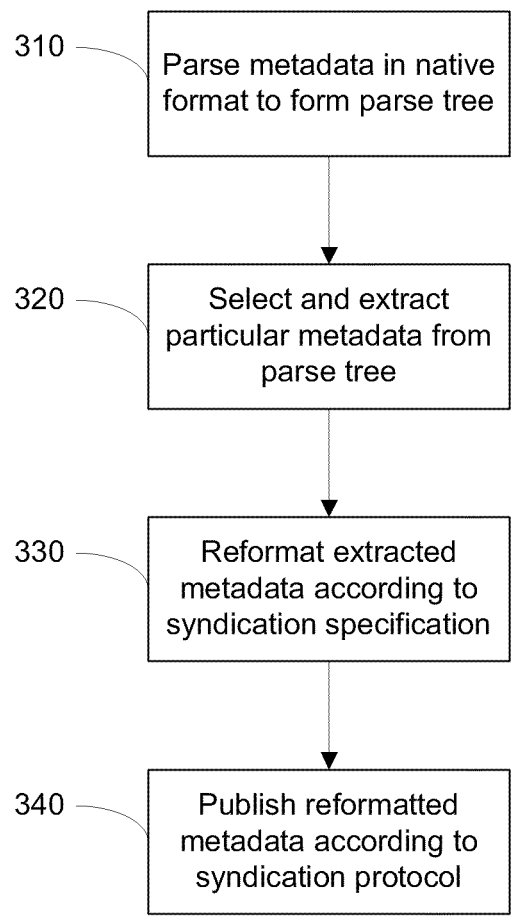
FIG. 3 is a block diagram of the major processes occurring during conversion of metadata from its native format to a syndication format, as indicated in FIG. 2.

In accordance with embodiments of the present invention, formatted metadata describing that content is also stored on the fileserver. One such format conforms to the Asset Distribution Interface (ADI) specification published by Cable Television Laboratories, Inc. (CableLabs®) of Louisville, Colo. The ADI format allows a source media distributor to describe a bundle of related video, audio, and images in a single media asset package. In exemplary embodiments of the invention, an ADI file is stored on the file server 102 and associated with a particular media asset package. Usually, the ADI file is generated by the network operator as new source media are acquired. For example, the video server 106 can be configured to generate an ADI file automatically for each segment of video it receives and encodes, where broadcast video segments are delineated using cue tones or embedded digital markers as is known in the art to enable this function (and other functions). In accordance with embodiments of this invention, a metadata server 112 converts this metadata from its native format into a syndication format, such as RSS, and publishes it. FIG. 3 shows the operation of the metadata server 112 in more detail.

The RSS feed itself is retrieved by a video generator and used to create interactive content. The video generator may be, for example, video server 106 located on the network premises, or the video generator may be remote from the premises where the source media content entered the television system. Thus, the video generator may be located at a second network premises, or even remote from all network premises in a separate facility. An example of remote interactive video generation in a separate facility is described in U.S. patent application Ser. No. 10/253,109, filed Sep. 24, 2002, entitled "Interactive Cable System with Remote Processors," the contents of which are hereby incorporated by reference in their entirety. The video generator may retrieve the RSS feed in response to user-defined events such as button presses, as described more fully below, or on a regular basis, such as once per minute.

The functional components described above transmit data to each other using a data communication network, such as local area network 110. Although this network is shown as contained on a single network premises 100, it will be understood that a network operator may distribute the relevant functional components throughout a number of network premises. For example, a satellite dish on one premises may be used to acquire source video, which is then transferred using a private network to other premises for distribution to local subscribers. In such cases, local area network may be replaced by a wide area network or other appropriate network, such as the Internet.

These components may be used in any of a number of ways in accordance with various embodiments of the invention. For example, suppose a particular source media content is a video recording of a sporting event, obtained by a broadcast network for distribution over a cable television system that offers many channels to its subscribers. The cable television provider may wish to make a recording of that broadcast available to its subscribers in an on-demand basis. A subscriber would typically access this on-demand content by tuning a set-top box to a particular channel, and navigating a series of menus to locate the desired broadcast content.

To facilitate this process, the broadcast network encodes the video recording in a raw digital video format and provides it to the cable television system in a storage arrangement. In one embodiment, the cable television system schedules a job that runs in the storage arrangement on a regular basis to notify various video servers, distributed throughout the cable television system, that new source media content has been received. Notification is performed using a syndication feed as described herein. To be specific, the scheduled process produces the syndication feed by analyzing the metadata associated with video content in the storage arrangement, in accordance with the processes described in connection with FIG. 3.

This syndication feed is then published internally to the cable television system, allowing a video server, such as video server 106, to prepare the source media content for viewing by a subscriber. Such preparation includes, for example, transcoding the raw video into an audio/video format (e.g. MPEG) that is displayable on a subscriber set-top box, and storing the transcoded video so that other applications may use the transcoded video. Distribution points may include cable headends remote from the intake site. Transcoding and distribution may be done automatically, based on information about the likely or actual demand for such source media content, as well as hardware used in subscriber set-top boxes, subscription features that subscribers have paid for and activated. If this process is successful, appropriate actions may be taken to notify other cable television system software or hardware (such as a video stitcher) that new, prepared content is available. For example, other components may be notified that transcoded content is ready through use of a "playlist," or other suitable means. A video stitcher, for example, may read the updated playlist. Then, in response to a subscriber request, the video stitcher may stitch the prepared source media content with previously prepared and encoded menuing elements, such as buttons and text, to form an interactive menuing system. Because the media content is already encoded for display, the stitching process may proceed very rapidly, without the need to further encode any of the components that make up a displayed menu screen.

A person having skill in the art may see how other embodiments of the invention may be constructed to suit other network architectures. For example, a video provider 162 may be used as an intermediary if the broadcast network does not contract directly with the cable television provider. In an alternate embodiment, distribution within the cable television network may itself be driven by the RSS feed. Thus, several different local or regional branches of the cable television network may subscribe to the same RSS feed. Each branch may operate a cable headend that performs the functions as described above. Thus, each headend independently retrieves the raw video content, transcodes it, and stores the transcoded video locally for use by local (or remote) interactive video stitchers. A skilled person may see how to adapt this example to other network architectures where syndication protocols are useful.

Figure 2:
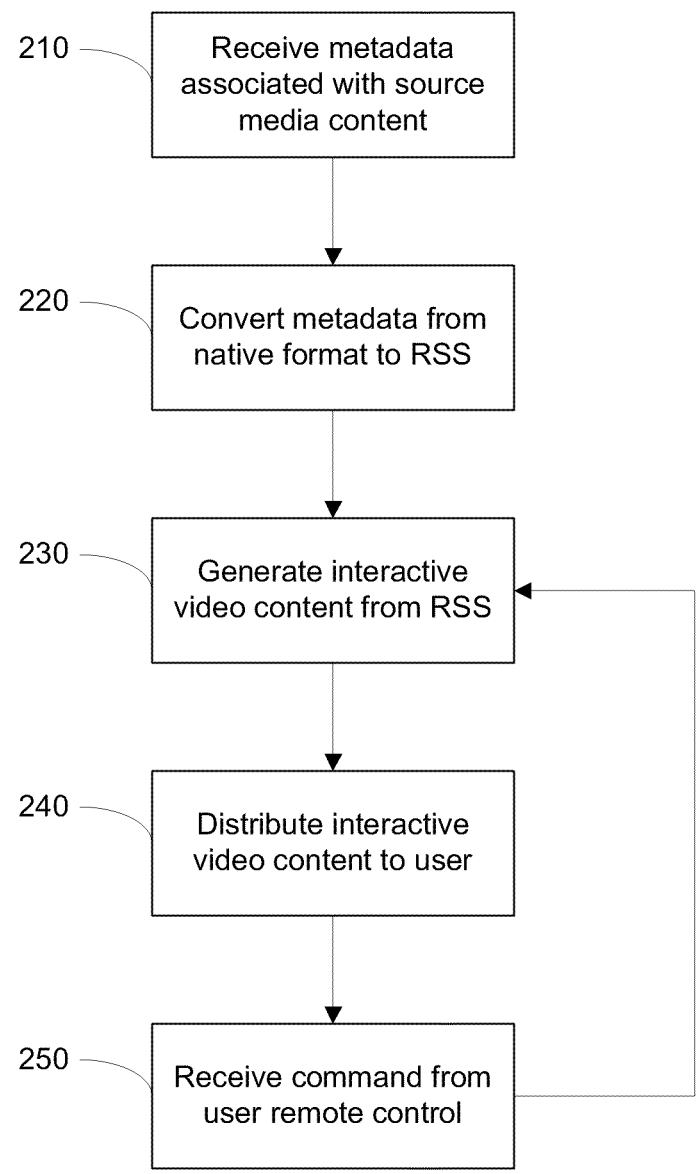
FIG. 2 is a block diagram of a metadata transformation in accordance with an embodiment of the invention.

FIG. 2 is a block diagram of a metadata transformation in accordance with an embodiment of the invention. In this embodiment, a television service provider generates interactive television signals, such as a menuing system. The interactive content is based on particular source media acquired by the service for use by its subscribers. For example, a cable TV service may obtain the rights to distribute movies from several distributors, and offer the movies as a "video on demand" subscription service. The service acquires movie assets, each of which may include the movie video, movie trailers, a movie poster, and descriptive text. The service then generates a catalog through which a subscriber can browse using a remote control to select a movie, view the poster and summary, watch the trailers, and order the movie. The catalog itself may be part of a larger system of interactive menus that the subscriber can navigate. The television service then encodes the interactive video for distribution through the network to user service interface devices, and responds to commands received from the interface devices to modify the interactive content. A network operator may install and maintain computer equipment for carrying out these functions at network premises, such as a cable TV headend, or at another location convenient for the network operator.

The overall process begins in box 210, in which the service provider receives metadata associated with source media content, such as a movie or sporting event. The metadata may come from a content distributor, such as a movie distributor, or it may be generated in the service network. If the metadata comes from a third party, it may be received in a batch process, for example nightly, or the television service may request metadata updates from the distributor on a regular basis. If the metadata is generated in the network itself, it may be transferred to the file server as it is created. Other, similar data transfer methods known in the art also may be employed.

In box 220 the television service converts the metadata from a native format (e.g., ADI) into a syndication format (e.g., RSS). Conversion is used to adapt the metadata that describe source media content into a format that permits its easy distribution within the systems of the service provider according to known, inexpensive techniques such as RSS syndication. Without this adaptation, custom software and hardware integration would be required to adapt generation of interactive video, such as menuing systems, to source media metadata. The process of conversion is described in more detail below in connection with FIG. 3. While the written description given herein primarily relates to RSS, it should be understood that other systems and data formats known in the art for syndicating content may be substituted without deviating from the scope of the invention. At the same time, as described above, the source media content is transcoded, if necessary, into a format that permits rapid stitching with other video components.

In box 230 the service generates interactive video content. Several inputs are used to generate the video content, including the RSS metadata, the encoded media content, and (as described in more detail below) interactive commands received from a subscriber. Commands sent by a subscriber may instruct the generator to, for example, display a menu or a highlighted button, generate a picture-in-picture signal, pass a source media content unmodified, or take any other appropriate and supported action. Video generation occurs in a computer processor, such as a microprocessor, and may include the use of MPEG objects, as that term is herein expressly defined. Video stitching is then performed. The video encoding format used in the stitcher is chosen by the network operator to work with user service interface devices, such as set-top boxes, that subscribers use to receive video data from the network and send interactive commands to the network. Such devices typically provide only a small number of encodings from which the network operator must choose, a common encoding being MPEG-2.

In box 240 the television service distributes the interactive video content to a user or subscriber. It is distributed to a subscriber via network 140, which may include the Internet, a wide area network, a satellite network, a broadcast network, a cable network, or other data communication network known in the art. The user receives the interactive video, displays it on a television display, and selects an interactive function using a remote control.

In box 250, the television service receives an interactive command from the user's remote control, by way of the associated user service interface device. Such a command may be caused, for example, when the user presses a navigation or selection button on a remote control. While video content is distributed via a downstream network, the command is received through a return network that may be different. For example, a satellite TV subscriber typically does not send commands back to the network operator through the satellite, but through another network such as the Internet 160 or the telephone network. Returning to box 230 as indicated, the television service may use the received command to alter the interactive video. As an example, the service first transmits a video menu with several choices. The user sees the choices, and selects one. The service receives the selection command and then, in accordance with an embodiment of the present invention, generates a submenu video signal based on the RSS feed, the video source, and the selection command as a second, interactive video signal.

Video generation may include rechecking the RSS feed for new data. Thus, a menu of on-demand video content may be updated with new content from the RSS feed when a user presses any button, such as a page-up or page-down navigation button. Or, the video content available to be presented to the user may change while the user is browsing a submenu, and is updated when the user presses a last-menu or go-back button. Or, the menu itself may display an indication that new content is available due to updated information, and ask the user to refresh the menu to see the new content. A skilled person may see how other types of similar subscriber-service interactions using data from an RSS feed may be used within the scope of the invention.

FIG. 3 is a block diagram of the major processes occurring during conversion of metadata from its native format to a syndication format, as indicated in box 220 of FIG. 2. Metadata is received at the beginning of these processes in a native encoding. For example, this native encoding could be XML in accordance with the CableLabs® ADI specification, or another encoding well known in the art. Such formats allow metadata to be encoded in a hierarchical format, wherein metadata is encapsulated in a data structure, and various data structures may contain other data structures, as defined by the specification. To facilitate description of embodiments of the invention, parsing is shown in FIG. 3 as a process separate from extraction of metadata, in accordance with the Document Object Model (DOM). It will be understood that embodiments of the invention disclosed herein may use other types of parsing known in the art, such as the Simple API for XML (SAX), in which the metadata are extracted during the parsing process, as well as parsing according to non-XML metadata formats. In addition, the steps of parsing, extracting, and reformatting may be accomplished by utilities, such as Extensible Stylesheet Language Transformations (XSLT).

In box 310, the native format is parsed to extract the metadata from its encoding to form a parse tree. Such a parse tree preserves the hierarchical nature of the metadata, if any, while freeing it from the particular data format in which it was encoded. Thus, the native metadata format is not limited to ADI, or even XML, but may be any appropriate encoding according to a storage specification. For example, metadata may be stored in a database, or in a "flat" text file, so long as it may be parsed predictably.

As a concrete example of a data format that may be parsed in accordance with embodiments of this invention, consider version 1.1 of the ADI specification, which is incorporated by reference herein. Appendix 1 of the ADI contains an XML Document Type Definition (DTD). A document that may be parsed according to this particular DTD provides a top level <ADI> element, within which are a <Metadata> element and zero or more <Asset> elements. The <Asset> elements, in turn, each contain a <Metadata> element, zero or more nested <Asset> elements, and an optional <Content> element. Each <Metadata> element has an <AMS> element and zero or more <App_Data> elements. The <App_Data> element has a number of attributes, namely App, Name, and Value. The <AMS> element has a number of attributes as well. From this description, a text document conforming to these rules may be parsed into a hierarchical tree of elements, using techniques known in the art.

In box 320, particular kinds of metadata are selected and extracted from the parse tree. The kinds of metadata that are selected may vary according to the television network's desired level of interactivity and the television service's requirements for video generation. For example, a television service may wish to provide to its subscribers an electronic menu containing different movies for on-demand viewing. Attributes such as the title of the movie, a summary of its plot and characters, and its release date should be accessible to the video generators in order to create the interactive electronic menu. Other attributes from the parse tree may be useful to assist in the process of video generation. These attributes include a URL or other network location at which the source video may be found, and a globally unique identifier pertaining to the source media for use in caching or other optimizations.

Continuing the ADI example above, metadata for an exemplary media asset package is given in Appendix II.1 of the version 1.1 ADI specification. This package contains metadata for media assets pertaining to the movie Captain Corelli's Mandolin. The metadata file has a <Metadata> element for the entire package, followed by an <Asset> element for the film title. This <Asset>, in turn, contains a <Metadata> element in which are found several <App_Data> elements containing information of possible interest to a viewer. The <App_Data> element named "Title" has the value "Captain Corelli's Mandolin", the name of the movie. The <App_Data> element named "Summary_Short" has a value giving a paragraph of text describing the movie, and so on.

Other elements contain information of interest to the television service. The title <Asset> contains three other <Asset> elements: the film feature, trailer, and artwork respectively. As can be seen, each of these three <Asset> elements has a <Content> element that includes a URL value corresponding to data for the respective source media asset. Thus, the feature URL is "Mandolin.mpg", a video file in MPEG format. Also, each <Asset> has an <AMS> element that has an Asset_ID attribute whose value is a globally unique asset identifier. Because their locations within the parse tree are known, these useful metadata may be selected and extracted from the parse tree in box 320.

In box 330, the useful metadata are reformatted according to a syndication specification, such as RSS. RSS items have elements such as <title>, <description>, <url>, <pubdate>, and <guid> that correspond to various functions provided by the RSS protocol. These logically correspond to values that appear in an ADI-compliant document. Continuing the previous example, the RSS <title> element for a new movie may be populated with the value of the appropriate <App_Data> element named "Title", using the value extracted in box 320. The other RSS elements may be similarly populated. The end result of the process in box 330 is a metadata file formatted according to the syndication specification.

In box 340, the reformatted metadata are published according to the protocol in the syndication specification. For example, publishing an RSS feed involves configuring and operating a web server, and placing the RSS document in a particular directory within the publicly-visible areas of the web server. In this way, when an RSS subscriber accesses the feed URL, the web server maps that URL onto the directory and file name of the RSS document, and provides the subscriber with the contents of the document.

Continuing the example above, a video generator can subscribe to a particular RSS feed, for example a feed of all licensed movies. The contents of the feed document would include an RSS item for the movie Captain Corelli's Mandolin that contains a short description of the movie, a link to an image of the movie poster that the video generator can resize and stitch into the electronic menu in a particular position according to a graphical layout template, a link to a trailer for which the video generator may provide an interactive menu button, a global identifier that can be used to check a local cache for movie data, and so on. The video generator can use this information to generate custom interactive video for individual subscribers. By employing RSS or a similar syndication protocol, this process can scale efficiently with the number of video generators, and with the number of subscribers that must be supported.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for providing interactive video content to a subscriber device based on a media asset, the media asset including source media content and associated source media metadata, the media metadata being encoded in a storage format that conforms to a media metadata specification, the method comprising:

receiving the media asset from a data communication network;

in a first computer process, transforming at least a portion of the metadata from the storage format into a syndication format that conforms to a syndication metadata specification;

publishing the transformed metadata to a plurality of interactive video content generators according to a syndication protocol; and in a second computer process, at least one of the plurality of interactive video content generators generating interactive video content that includes at least a portion of the transformed metadata in response to receiving a request for the interactive video content from the subscriber device.

2. The method according to claim 1, wherein receiving the metadata includes receiving a data package comprising the metadata.

3. The method according to claim 2, wherein receiving the data package includes receiving a collection of data packages including the data package.

4. The method according to claim 1, wherein the data communication network includes the Internet, a satellite network, a local area network, a wide area network, a storage area network, or network attached storage.

5. The method according to claim 1, wherein the metadata includes information identifying a location from which the media asset may be retrieved.

6. The method according to claim 1, wherein the media metadata specification is an Asset Distribution Interface specification.

7. The method according to claim 1, wherein the syndication metadata specification is an RSS specification.

8. The method according to claim 1, wherein the syndication protocol is an RSS protocol.

9. The method according to claim 1, wherein generating video content includes encoding the content according to an MPEG specification.

10. The method according to claim 9, wherein encoding the content according to an MPEG specification includes stitching together a plurality of MPEG video streams according to a graphics layout template.

11. The method according to claim 10, further comprising distributing the encoded video content to a given user for display on a user display device.

12. The method according to claim 11, wherein distributing the encoded video content includes distributing over a wide area network, a satellite network, a broadcast network, a cable network, or the Internet.

13. The method according to claim 11, further comprising:
   receiving an electronic command relating to the distributed video content from a user interface associated with the user display device; and
   in a computer process, generating second interactive video content from at least the transformed metadata and the electronic command.

14. The method according to claim 13, wherein the second video content is also generated from the source media.

15. The method according to claim 1, wherein the video content is also generated from the source media.

16. The method according to claim 1, wherein the second computer process comprises an MPEG Object.

17. A computer program product comprising a tangible, computer-readable medium having thereon non-transitory computer program code for instructing a computer processor to perform a method for providing interactive video content to a subscriber device based on a media asset, the media asset including source media content and associated source media metadata, the media metadata being encoded in a storage format that conforms to a media metadata specification, the product including:
   program code for receiving the media asset from a data communication network;
   program code for transforming, in a first computer process, at least a portion of the metadata from the storage format into a syndication format that conforms to a syndication metadata specification;
   program code for publishing the transformed metadata to a plurality of interactive video content generators according to a syndication protocol; and
   program code for generating, in a second computer process in at least one of the plurality of interactive video content generators, interactive video content that includes at least a portion of the transformed metadata, in response to receiving a request for the interactive video content from the subscriber device.

18. The computer program product according to claim 17, further comprising program code for receiving a data package comprising the metadata.

19. The computer program product according to claim 18, further comprising program code for receiving a collection of data packages comprising the data package.

20. The computer program product according to claim 17, wherein the data communication network includes the Internet, a satellite network, a local area network, a wide area network, a storage area network, or network attached storage.

21. The computer program product according to claim 17, further comprising program code for parsing the metadata to obtain information identifying a location from which the media asset may be retrieved.

22. The computer program product according to claim 17, wherein the media metadata specification is an Asset Distribution Interface specification.

23. The computer program product according to claim 17, wherein the syndication metadata specification is an RSS specification 24. The computer program product according to claim 17, wherein the syndication protocol is an RSS protocol.

25. The computer program product according to claim 17, further comprising program code for encoding the content according to an MPEG specification.

26. The computer program product according to claim 25, further comprising program code for stitching together a plurality of MPEG video streams according to a graphics layout template.

27. The computer program product according to claim 26, further comprising program code for distributing the encoded video content to a given user for display on a user display device.

28. The computer program product according to claim 27, wherein distributing the encoded video content includes distributing over the Internet, a wide area network, a satellite network, a broadcast network, or a cable network.

29. The computer program product according to claim 27, further comprising:
   program code for receiving an electronic command relating to the distributed video content from a user interface associated with the user display device; and
   program code for generating, in a computer process, second interactive video content from the transformed metadata and the electronic command.

30. The computer program product according to claim 29, further comprising program code for generating the video content from the source media.

31. The computer program product according to claim 17, further comprising program code for generating the video content from the source media.

32. The computer program product according to claim 17, wherein the second computer process comprises an MPEG Object.

33. A system for providing interactive video content to a subscriber device based on a media asset, the media asset including source media content and associated source media metadata, the media metadata being encoded in a storage format that conforms to a media metadata specification, the system comprising:
- an interface port for receiving the media asset from a data communication network;
- a first processor module, operatively coupled with the interface port, for
  (1) transforming at least a portion of the metadata from the storage format into a syndication format that conforms to a syndication metadata specification, and
  (2) publishing the transformed metadata to a plurality of interactive video content generators according to a syndication protocol; and
- a second processor module in at least one of the plurality of interactive video content generators for generating interactive video content that includes at least a portion of the transformed metadata in response to receiving a request for the interactive video content from the subscriber device.

34. The system of claim 33, wherein the interface port is an Ethernet port.

35. The system of claim 33, wherein the first processor module comprises a microprocessor.

36. The system of claim 35, wherein the second processor module comprises a microprocessor.

37. The system of claim 33, further comprising a local area network or a wide area network for operatively coupling the first processor module to the second processor module.

* * * * *